United States Patent
Evangelidis

(10) Patent No.: US 11,403,499 B2
(45) Date of Patent: *Aug. 2, 2022

(54) SYSTEMS AND METHODS FOR GENERATING COMPOSITE SETS OF DATA FROM DIFFERENT SENSORS

(71) Applicant: FACEBOOK TECHNOLOGIES, LLC, Menlo Park, CA (US)

(72) Inventor: Georgios Evangelidis, Vienna (AT)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 16 days.

This patent is subject to a terminal disclaimer.

(21) Appl. No.: 17/095,177

(22) Filed: Nov. 11, 2020

(65) Prior Publication Data

US 2021/0133517 A1 May 6, 2021

Related U.S. Application Data

(63) Continuation of application No. 16/414,696, filed on May 16, 2019, now Pat. No. 10,867,220.

(51) Int. Cl.
*G06K 9/00* (2022.01)
*G06K 9/62* (2022.01)
(Continued)

(52) U.S. Cl.
CPC ......... *G06K 9/6293* (2013.01); *G06K 9/6218* (2013.01); *G06T 7/20* (2013.01);
(Continued)

(58) Field of Classification Search
CPC ...... G06K 9/6293; G06K 9/6218; G06T 7/20; G06T 7/55; G06T 7/70; G06T 7/97;
(Continued)

(56) References Cited

U.S. PATENT DOCUMENTS 10,110,794 B2 10/2018 Laroia et al.
10,122,993 B2 11/2018 Venkataraman et al.
(Continued)

FOREIGN PATENT DOCUMENTS

CN 102387374 A 3/2012
EP 3131060 A1 2/2017
WO WO-2017112800 A1 6/2017

OTHER PUBLICATIONS

U.S. Appl. No. 16/414,696, now U.S. Pat. No. 10,867,220, filed May 16, 2019, Systems and Methods for Generating Composite Sets of Data From Different Sensors.
(Continued)

*Primary Examiner* — Charlotte M Baker
(74) *Attorney, Agent, or Firm* — Amin, Turocy & Watson, LLP

(57) ABSTRACT

Systems and methods for generating composite sets of data based on sensor data from different sensors are disclosed. Exemplary implementations may capture a color image including chromatic information; capture a depth image; generate inertial signals conveying values that are used to determine motion parameters; determine the motion parameters based on the inertial signals; generate a re-projected depth image as if the depth image had been captured at the same time as the color image, based on the interpolation of motion parameters; and generate a composite set of data based on different kinds of sensor data by combining information from the color image, the re-projected depth image, and one or more motion parameters.

20 Claims, 8 Drawing Sheets

(51) Int. Cl.
   *G06T 7/20* (2017.01)
   *G06T 7/00* (2017.01)
   *G06T 7/70* (2017.01)
   *G06T 7/55* (2017.01)

(52) U.S. Cl.
   CPC ............ *G06T 7/55* (2017.01); *G06T 7/70* (2017.01); *G06T 7/97* (2017.01)

(58) Field of Classification Search
   CPC ... G06T 2210/56; G06T 15/20; G06T 3/4007; G06V 20/20
   USPC .......................... 382/100; 348/222.1, 5.093
   See application file for complete search history.

(56) References Cited

U.S. PATENT DOCUMENTS

| | | | |
   |---|---|---|---|
   | 10,686,980 | B1 | 6/2020 | Ricci et al. |
   | 10,867,220 | B2 | 12/2020 | Evangelidis et al. |
   | 2010/0157080 | A1* | 6/2010 | Kondo .............. H04N 5/91 348/222.1 |
   | 2011/0141227 | A1 | 6/2011 | Bigioi et al. |
   | 2014/0139639 | A1 | 5/2014 | Wagner et al. |
   | 2015/0161818 | A1 | 6/2015 | Komenczi et al. |
   | 2015/0246654 | A1 | 9/2015 | Tadic et al. |
   | 2016/0212411 | A1 | 7/2016 | Lindner et al. |
   | 2017/0053447 | A1 | 2/2017 | Chen et al. |
   | 2017/0123487 | A1 | 5/2017 | Hazra et al. |
   | 2017/0180639 | A1 | 6/2017 | Kamilov et al. |
   | 2017/0230641 | A1 | 8/2017 | Scavezze et al. |
   | 2017/0289515 | A1 | 10/2017 | Li et al. |
   | 2018/0139431 | A1 | 5/2018 | Simek et al. |
   | 2018/0173323 | A1 | 6/2018 | Harvey et al. |
   | 2018/0374192 | A1* | 12/2018 | Kunkel .............. G06T 3/0087 |
   | 2019/0001431 | A1 | 1/2019 | Bradski et al. |
   | 2019/0102956 | A1 | 4/2019 | Ishihara et al. |
   | 2019/0369807 | A1 | 12/2019 | Fujiwara |
   | 2020/0364519 | A1 | 11/2020 | Evangelidis |

OTHER PUBLICATIONS

"U.S. Appl. No. 16/414,696, Notice of Allowance dated Aug. 12, 2020", 10 pgs.
   Chen, Tzu-Fei, et al., "Integrating Depth Map and IMU Data for 3D Reconstruction from a Single Image", Aiming Smart Space Sensing, (2012), 8 pgs.
   Nießner, M., et al., "Combining Inertial Navigation and ICP for Real-time 3D Surface Reconstruction", Eurographics (Short Papers), pp. 13-16, (2014), 4 p.

* cited by examiner

SYSTEMS AND METHODS FOR GENERATING COMPOSITE SETS OF DATA FROM DIFFERENT SENSORS

FIELD OF THE DISCLOSURE

The present disclosure relates to systems and methods for generating composite sets of data from different sensors, e.g., different types of sensors having different rates of operation.

BACKGROUND

Image sensors, depth sensors, inertial sensors, thermal sensors, and other sensors are known. Depth images as captured by a depth sensor are known. Determining the movement an object has made based on signals from an inertial sensor (coupled to the object) is known.

SUMMARY

One aspect of the present disclosure relates to a system configured for generating composite sets of data based on sensor data from different sensors. The system may include one or more hardware processors configured by machine-readable instructions. The system may be configured to capture, by an image sensor, images from viewpoints, the images including chromatic information. The chromatic information of individual images may indicate one or more colors viewable by the image sensor from individual viewpoints of the image sensor. The images may include a first image captured at a first image capture time from a first image viewpoint. The system may be configured to capture, by a depth sensor, depth images from viewpoints of the depth sensor. The depth images may include depth information. The depth information of individual depth images may be captured from individual viewpoints of the depth sensor. The depth information of the individual depth images may indicate distances from the individual viewpoints to surfaces viewable by the depth sensor from the individual viewpoints. The depth images may include a first depth image including first depth information. The first depth information may be captured from a first depth viewpoint at a first depth-capture time. The first depth information may indicate a first set of distances from the first depth viewpoint to the surfaces. The system may be configured to generate, by an inertial sensor, inertial signals that convey values that are used to determine motion parameters characterizing position and orientation of the inertial sensor in a reference coordinate system. The inertial signals may include a first set of inertial signals generated at a first inertial-sensor-measurement time that convey a first set of values that is used to determine a first set of motion parameters and a second set of inertial signals generated at a second inertial-sensor-measurement time that convey a second set of values that is used to determine a second set of motion parameters. The processor(s) may be configured to determine the first set of values of the first set of one or more motion parameters based on the first set of inertial signals. The second set of values of the second set of one or more motion parameters may be based (at least in part) on the second set of inertial signals. A set of values of one or more interpolated motion parameters (also referred to as an interpolated set) may be based on the first set of values and the second set of values. The interpolated set of values may correspond to a point in time between the first inertial-sensor-measurement time and the second inertial-sensor-measurement time (in particular, at the first image capture time). The processor(s) may be configured to generate a first re-projected depth image representing the first depth information included in the first depth image as if the first depth image had been captured at a point in time between the first inertial-sensor-measurement time and the second inertial-sensor-measurement time (in particular, at the first image capture time). Generation of the first re-projected depth image may be based on the interpolated set of values. The processor(s) may be configured to generate a composite set of data by combining information from the first image, the first re-projected depth image, and the interpolated set of one or more interpolated motion parameters.

Another aspect of the present disclosure relates to a method for generating composite sets of data based on sensor data from different sensors. The method may include capturing, by an image sensor, images from viewpoints, the images including chromatic information. The chromatic information of individual images may indicate one or more colors viewable by the image sensor from individual viewpoints of the image sensor. The images may include a first image captured at a first image capture time from a first image viewpoint. The method may include capturing, by a depth sensor, depth images from viewpoints of the depth sensor. The depth images may include depth information. The depth information of individual depth images may be captured from individual viewpoints of the depth sensor. The depth information of the individual depth images may indicate distances from the individual viewpoints to surfaces viewable by the depth sensor from the individual viewpoints. The depth images may include a first depth image including first depth information. The first depth information may be captured from a first depth viewpoint at a first depth-capture time. The first depth information may indicate a first set of distances from the first depth viewpoint to the surfaces. The method may include generating, by an inertial sensor, inertial signals that convey values that are used to determine motion parameters characterizing position and orientation of the inertial sensor in a reference coordinate system. The inertial signals may include a first set of inertial signals generated at a first inertial-sensor-measurement time that convey a first set of values that is used to determine a first set of motion parameters and a second set of inertial signals generated at a second inertial-sensor-measurement time that convey a second set of values that is used to determine a second set of motion parameters. The method may include determining the first set of values of the first set of one or more motion parameters based on the first set of inertial signals. The second set of values of the second set of one or more motion parameters may be based (at least in part) on the second set of inertial signals. An interpolated set of values of one or more interpolated motion parameters may be based on the first set of values and the second set of values. The interpolated set of values may correspond to a point in time between the first inertial-sensor-measurement time and the second inertial-sensor-measurement time (in particular, at the first image capture time). The method may include generating a first re-projected depth image representing the first depth information included in the first depth image as if the first depth image had been captured at a point in time between the first inertial-sensor-measurement time and the second inertial-sensor-measurement time (in particular, at the first image capture time). Generation of the first re-projected depth image may be based on the interpolated set of values. The method may include generating a composite set of data by combining information from the first image, the first re-projected depth image, and the interpolated set of one or more interpolated motion parameters.

As used herein, any association (or relation, or reflection, or indication, or correspondency) involving servers, processors, client computing platforms, sensors, images, viewpoints, viewing angles, capture times, signals, values, parameters, positions, orientations, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect. As used herein, the term "determine" (and derivatives thereof) may include measure, calculate, compute, estimate, approximate, generate, and/or otherwise derive, and/or any combination thereof. As used herein, the term "composite" refers to a combination of different kinds of information, including but not limited to captured information, generated information, and interpolated information.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
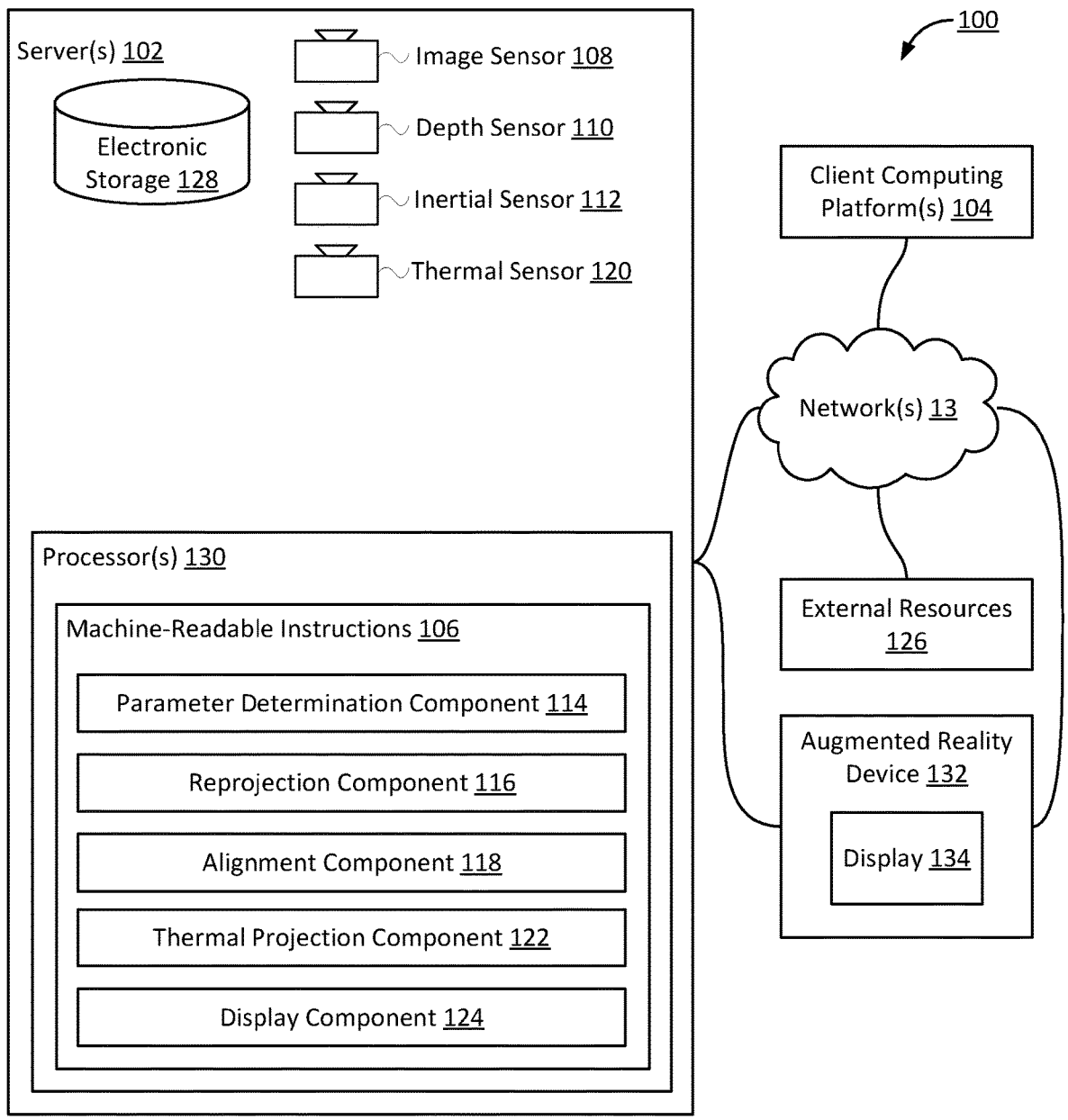
FIG. 1 illustrates a system configured for generating composite sets of data from different sensors, in accordance with one or more implementations.

FIG. 1 illustrates a system 100 configured for generating composite sets of data based on sensor data from different sensors, in accordance with one or more implementations. Different sensors may be rigidly attached to each other or to a structural component of system 100 (such as, by way of non-limiting example, a rig) such that their relative positions are fixed an unchanging even if one or more of the sensors move. In some implementations, system 100 may include one or more servers 102, an image sensor 108, a depth sensor 110, an inertial sensor 112, a thermal sensor 120, electronic storage 128, processor(s) 130, and/or other components. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104. In some implementations, system 100 may include an augmented reality device 132.

Different sensors may have different rates of operation. For example, a first sensor may generate signals at a first rate, a second sensor may generate signals at a second rate, a third sensor may generate signals at a third rate, and so forth. The sensors may be (rigidly and/or jointly) moving during operation, the movements including one or more of translation, rotation, and/or other movements. The signals generated by different sensors (and the information and/or parameters conveyed by these signals) may not be aligned temporally. For example, even if two sensors both generate signals at a frequency of 60 Hz, these signals may be temporally misaligned. In other words, these equal-rate signals may be generated at different points in time. Different points in time may correspond to different points in space. Even if multiple sensors use the same clock signal for timestamping generated data, the signals generated by the multiple sensors may still be generated at different points in time and/or space. By virtue of the technologies disclosed herein, sensor data from different sensors may be combined in composite sets of data that are temporally aligned as if they were produced by triggering the different sensors at the same time.

Image sensor 108 may be configured to capture images. Individual images may be captured from individual viewpoints. As used herein, a viewpoint may be defined by a combination of a three-dimensional position and a three-dimensional orientation in a reference coordinate system. In some implementations, individual images may be captured from individual orientations. In some implementations, individual images may be captured from individual positions. In some implementations, image sensor 108 may be configured to capture individual images at a particular capture rate, e.g., an image-capture rate of 20 Hz, 30 Hz, 40 Hz, 50 Hz, 60 Hz, 70 Hz, 80 Hz, 90 Hz, 100 Hz, and/or another capture rate. In some implementations, the position of a viewpoint may be represented by a location in three-dimensional space, such as, e.g., a reference coordinate system.

In some implementations, a viewpoint may be represented by a point in a three-dimensional reference coordinate system that characterizes the position of the image sensor 108 in the reference coordinate system, as well as by a three-dimensional vector in the reference coordinate system that characterizes the orientation of the image sensor 108 in the reference coordinate system. Likewise, a two-dimensional coordinate system may be used for reference. In some implementations, the location of image sensor 108 may correspond to the optical center of the image sensor 108, such as the lens center or the aperture center. In some implementations, this location may correspond to the origin of the image sensor (local) coordinate system. The direction of the orientation vector may be referred to as the viewing direction or the optical axis of image sensor 108. In some implementations, the orientation vector may coincide with one of the axis of the image-sensor (local) coordinate system. For drawing purposes, the starting point of the orientation vector may correspond to the viewpoint position of image sensor 108.

Figure 3A:
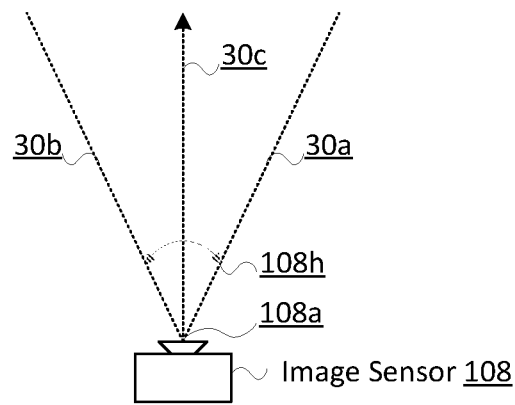
FIG. 3A-3B-3C-3D illustrate exemplary scenarios for the use of a system configured for generating composite sets of data from different sensors, in accordance with one or more implementations.

By way of non-limiting example, FIG. 3A illustrates an exemplary scenario 30 for the use of system 100, depicting a top view of image sensor 108 having a viewpoint 108*a*. The boundary of observable space for image sensor 108 in scenario 30 is depicted by boundaries 30*a* and 30*b*. As used herein, the term observable may refer to space that is depicted in a captured image. In some implementations, viewing direction 30*c* may correspond to the center of observable space for image sensor 108, which may be centered between boundaries 30*a* and 30*b*. The angle between boundaries 30*a* and 30*b* may represent a horizontal angle-of-view 108*h*.

Figure 3B:
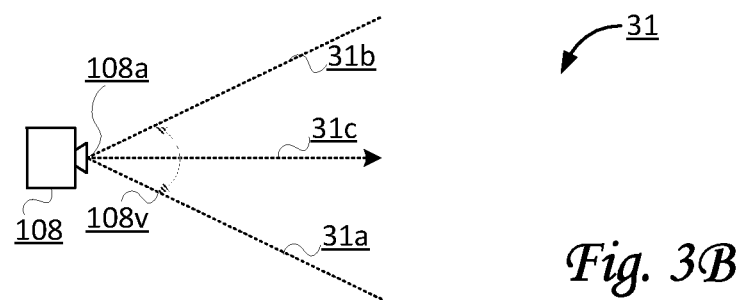

By way of non-limiting example, FIG. 3B illustrates an exemplary scenario 31 for the use of system 100, depicting a side view of image sensor 108 having a viewpoint 108*a*. The boundary of observable space for image sensor 108 in scenario 31 is depicted by boundaries 31*a* and 31*b*. Viewing direction 31*c* may correspond to the center of observable space for image sensor 108, which may be centered between boundaries 31*a* and 31*b*. The angle between boundaries 31*a* and 31*b* may represent a vertical angle-of-view 108*v*. In some implementations, viewing direction 30*c* in FIG. 3A may coincide which viewing direction 31*c* in FIG. 3B.

Figure 3C:
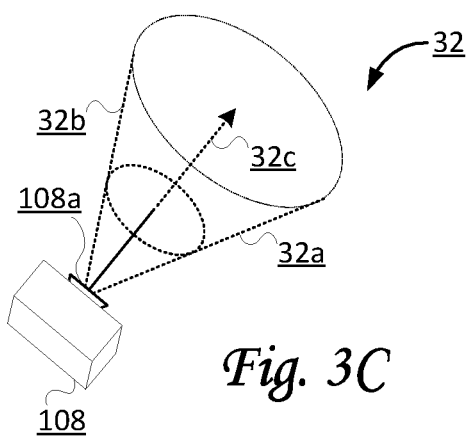

By way of non-limiting example, FIG. 3C illustrates an exemplary scenario 32 for the use of system 100, depicting an isometric and/or three-dimensional view of image sensor 108 having a viewpoint 108*a*. The boundaries of observable space for image sensor 108 in scenario 32 is depicted by boundaries 32*a* and 32*b*, which may form a shape similar to a cone. Viewing direction 32*c* may correspond to the center of observable space for image sensor 108, which may be centered between boundaries 32*a* and 32*b*.

Figure 3D:
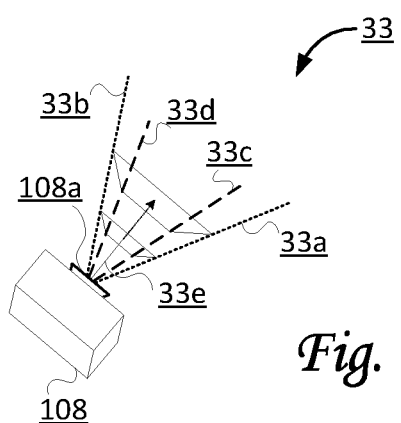

By way of non-limiting example, FIG. 3D illustrates an exemplary scenario 33 for the use of system 100, depicting an isometric and/or three-dimensional view of image sensor 108 having a viewpoint 108*a*. The boundary of observable space for image sensor 108 in scenario 33 is depicted by boundaries 33*a*, 33*b*, 33*c*, and 33*d*, which may form a shape similar to a pyramid. For example, the corners of boundaries 33*a*, 33*b*, 33*c*, and 33*d* may correspond to the corners (or corner pixels) of the image based on the information captured by image sensor 108. From the perspective of a viewer of a rectangular image within this observable space, boundary 33*a* may be the top right corner of the image, boundary 33*b* may be the top left corner of the image, boundary 33*c* may be the bottom right corner of the image, and boundary 33*d* may be the bottom left corner of the image. Viewing direction 33*e* corresponds to the center of observable space for image sensor 108 in scenario 33, which may be centered between boundaries 33*a*, 33*b*, 33*c*, and 33*d*.

Referring to FIG. 1 and image sensor 108, individual images may include chromatic information. The chromatic information of individual images may indicate one or more colors viewable by the image sensor from individual viewpoints of the image sensor. In some implementations, the chromatic information may be a black and white image. In some implementations, the chromatic information may be a color image, e.g., an image including red, green, and blue information. Other color formats are envisioned within the scope of this disclosure. The images may include a first image captured at a first image capture time from a first image viewpoint, a second image captured at a second image capture time from a second image viewpoint, a third image captured at a third image capture time from a third image viewpoint, and so forth.

Image sensor 108 may include, by way of non-limiting example, one or more of an image sensor, a camera, and/or another sensor. In some implementations, image sensor 108 may be physically and rigidly coupled to one or more other sensors, and/or another component of system 100. Accordingly, information from inertial sensor 112 may not only reflect motion of inertial sensor 112, but may also correspond in a known manner to motion of image sensor 108 and/or other components of system 100, due to their known relative position and orientation. In some implementations, one or more of the sensors of system 100 may include an altimeter (e.g., a sonic altimeter, a radar altimeter, and/or other types of altimeters), a barometer, a magnetometer, a pressure sensor (e.g., a static pressure sensor, a dynamic pressure sensor, a pitot sensor, etc.), a thermometer, an accelerometer, a gyroscope, an inertial measurement sensor, a geolocation sensor, global positioning system sensors, a tilt sensor, a motion sensor, a vibration sensor, a distancing sensor, an ultrasonic sensor, an infrared sensor, a light sensor, a microphone, an air speed sensor, a ground speed sensor, an altitude sensor, degree-of-freedom sensors (e.g., 6-DOF and/or 9-DOF sensors), a compass, and/or other sensors. As used herein, the term "motion sensor" may include one or more sensors configured to generate output conveying information related to position, location, distance, motion, movement, acceleration, jerk, jounce, and/or other motion-based parameters.

Output signals generated by individual sensors (and/or information based thereon) may be stored and/or transferred in electronic files. In some implementations, output signals generated by individual sensors (and/or information based thereon) may be streamed to one or more other components of system 100.

As used herein, the terms "camera" and/or "image sensor" may include any device that captures images, including but not limited to a single lens-based camera, a wide-lens camera, a camera array, a solid-state camera, a mechanical camera, a digital camera, an image sensor, a depth sensor, a remote sensor, a lidar, an infrared sensor, a (monochrome) complementary metal-oxide-semiconductor (CMOS) sensor, an active pixel sensor, and/or other sensors. Image sensor 108 may be configured to capture information, including but not limited to visual information, video information, audio information, geolocation information, orientation and/or motion information, depth information, and/or other information. Information captured by sensors may be marked, timestamped, annotated, and/or otherwise processed such that information captured by other sensors can be synchronized, aligned, annotated, and/or otherwise associated therewith. For example, video information captured by an image sensor may be synchronized with information captured by an accelerometer, GPS unit, and/or one or more other sensors.

In some implementations, an image sensor may be integrated with electronic storage such that captured information may be stored, at least initially, in integrated embedded storage. For example, a camera may include one or more image sensors and electronic storage media. In some implementations, an image sensor may be configured to transfer captured information to one or more components of system 100, including but not limited to remote electronic storage media, e.g., through "the cloud."

Depth sensor 110 may be configured to capture depth images. Individual images may be captured from individual viewpoints of depth sensor 110. In some implementations, individual depth images may be captured from individual orientations of depth sensor 110 (also referred to as individual depth orientations). In some implementations, individual depth images may be captured from individual positions of depth sensor 110 (also referred to as individual depth positions). In some implementations, depth sensor 110 may be configured to capture individual depth images at a particular capture rate, e.g., a depth-capture rate of 10 Hz, 20 Hz, 30 Hz, 40 Hz, 50 Hz, 60 Hz, 70 Hz, 80 Hz, 90 Hz, 100 Hz, and/or another depth-capture rate. In some implementations, depth sensor 110 may be one or more of a structured-light active stereo sensor, a passive stereo sensor, a continuous-wave time-of-flight (TOF) range sensor, a pulsed-light TOF sensor, and/or one or more other types of depth sensors.

The depth images may include depth information. The depth information of individual depth images may be captured from individual viewpoints of depth sensor 110. The depth images may include a first depth image including first depth information, a second depth image including second depth information, a third depth image including third depth information, and so forth. The first depth information may be captured from a first depth viewpoint at a first depth-capture time. The second depth information may be captured from a second depth viewpoint at a second depth-capture time. The third depth information may be captured from a third depth viewpoint at a third depth-capture time, and so forth.

Figure 5:
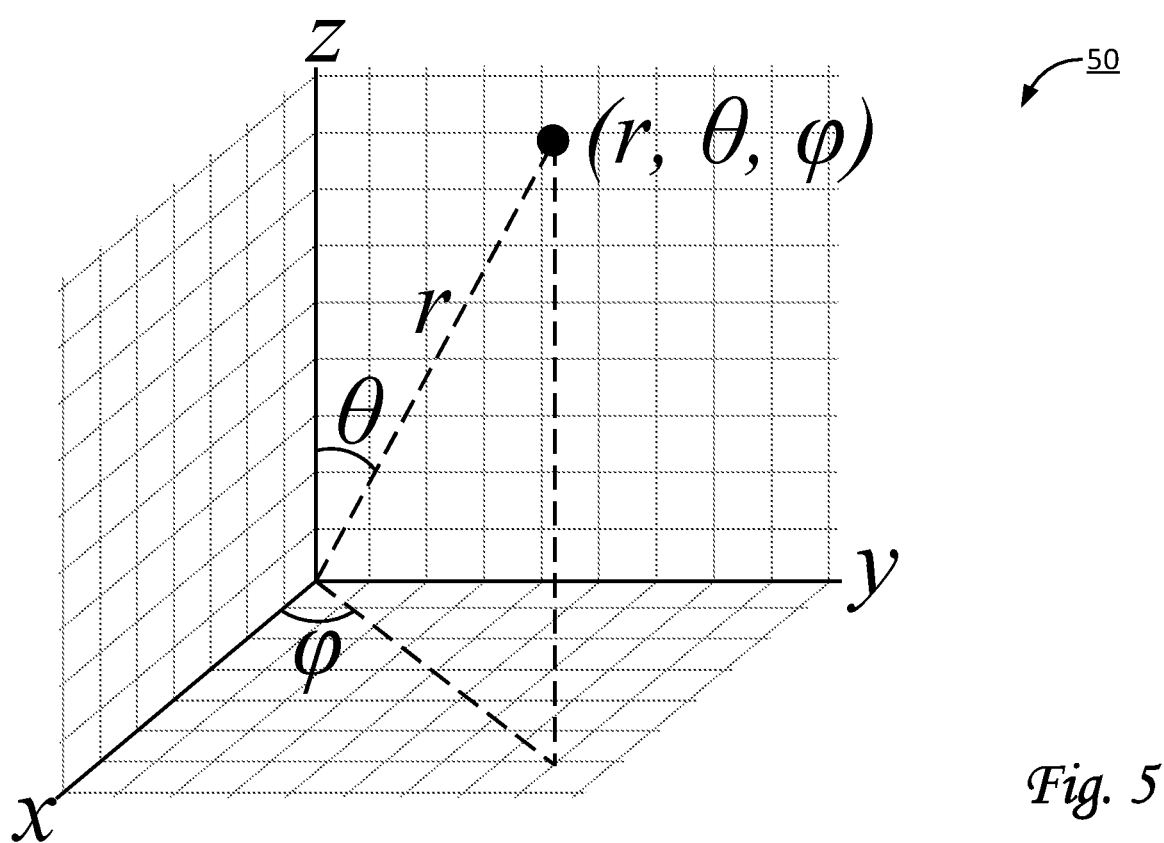
FIG. 5 illustrates a spherical coordinate system as may be used by a system configured for generating composite sets of data from different sensors, in accordance with one or more implementations.

In some implementations, the depth information of the individual depth images may indicate distances from the individual viewpoints to surfaces viewable by the depth sensor from the individual viewpoints. For example, the first depth information may indicate a first set of distances from the first depth viewpoint to the surfaces. In some implementations, the depth information of an individual element of a depth image may be a three-dimensional position, and the depth information of the entire depth image may form a three-dimensional point cloud. By way of non-limiting example, FIG. 5 illustrates a spherical coordinate system 50 for three-dimensional space (having an x-axis, y-axis, and z-axis), where the position of any point is specified by three numbers: the radial distance of that point from a fixed origin, its polar angle measured from a fixed zenith direction, and the azimuth angle of its orthogonal projection on a reference plane that passes through the origin and is orthogonal to the zenith, measured from a fixed reference direction on that plane. As depicted in spherical coordinate system 50, these three numbers may be referred to by the set of symbols (r, θ, φ), which gives the radial distance, polar angle, and azimuthal angle. To define a spherical coordinate system, one must choose two orthogonal directions, the zenith and the azimuth reference, and an origin point in space. These choices determine a reference plane that contains the origin and is perpendicular to the zenith. The spherical coordinates of a point P are then defined as follows:

The radius or radial distance is the Euclidean distance from the origin O to P.

The inclination (or polar angle) is the angle between the zenith direction and the line segment OP.

The azimuth (or azimuthal angle) is the signed angle measured from the azimuth reference direction to the orthogonal projection of the line segment OP on the reference plane.

The sign of the azimuth may be determined by choosing what is a positive sense of turning about the zenith. This choice is arbitrary, and is part of the coordinate system's definition.

Figure 4A:
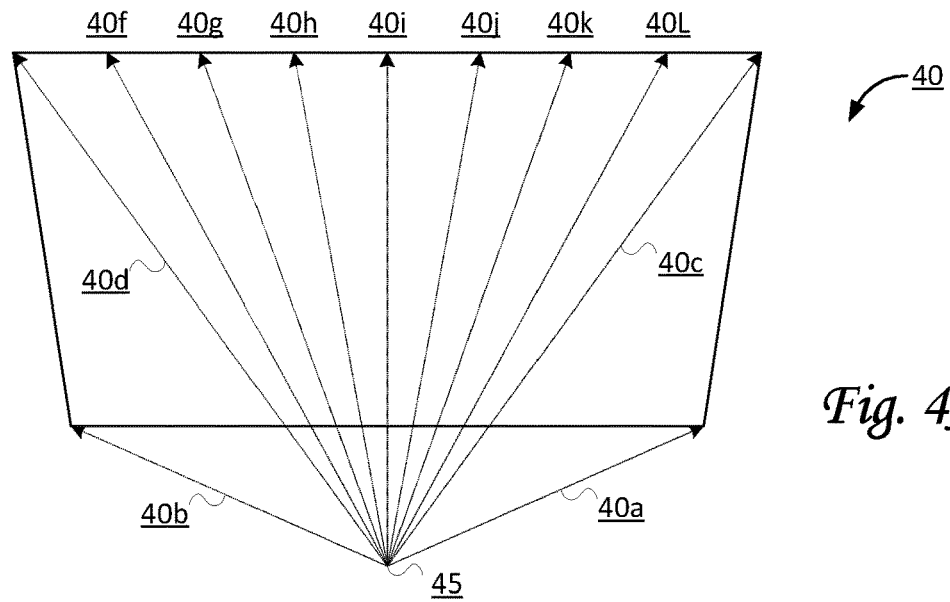
FIG. 4A-4B-4C illustrate exemplary depth images from elevated viewpoints as may be used by a system configured for generating composite sets of data from different sensors, in accordance with one or more implementations.
Figure 4B:
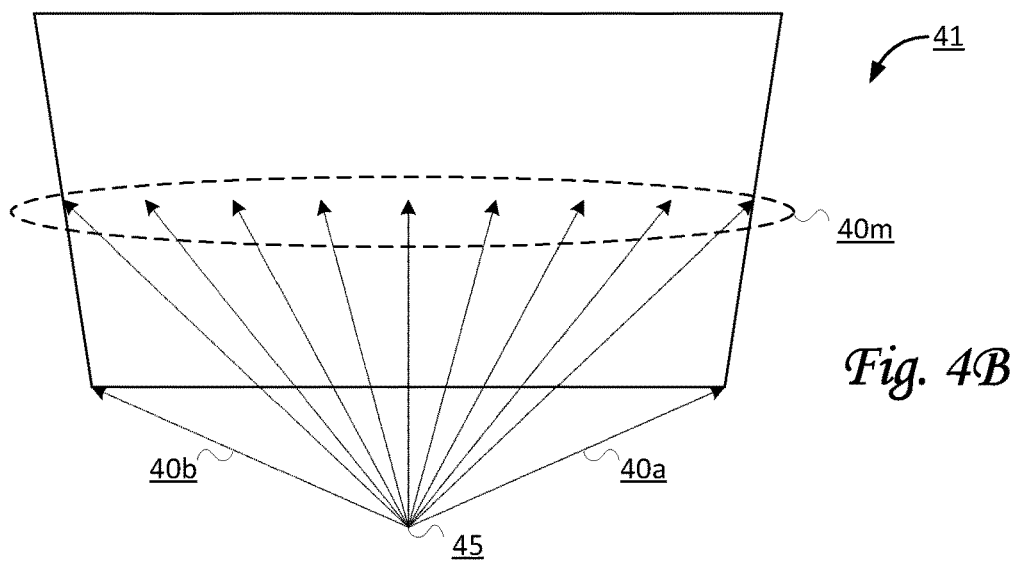

In some implementations, the depth information of an individual depth image may indicate distances (e.g., radial distances) from a particular depth viewpoint of depth sensor 110. A particular radial distance of an individual element of a depth image may correspond to a particular polar angle and a particular azimuth angle. Other coordinate systems are envisioned within the scope of this disclosure, including but not limited to non-spherical coordinate systems such as, for example, Cartesian Coordinates (Euclidean space), and/or other coordinate systems. By way of non-limiting example, FIG. 4A illustrates an exemplary depth image 40 from an elevated viewpoint. Exemplary depth image 40 indicates distances from a particular depth viewpoint 45. The boundaries of observable space of depth sensor 110 from particular depth viewpoint 45 is depicted by boundaries 40a, 40b, 40c, and 40d, which form a shape similar to a pyramid. From the perspective of a viewer of exemplary depth image 40, boundary 40c may be the top right corner of the image, boundary 40d may be the top left corner of the image, boundary 40a may be the bottom right corner of the image, and boundary 40b may be the bottom left corner of exemplary depth image 40. In some implementations, the elements in a depth image may be arranged in a grid, in a similar arrangement as pixels in color images. For example, as depicted in FIG. 4A, the top row of elements in exemplary depth image 40 may include elements 40f, 40g, 40h, 40i, 40j, 40k, and 40L. The number of elements depicted is exemplary and not intended to be limiting in any way. The resolution of depth images is not limited by any figure in this disclosure. An individual element of a depth image may correspond to a particular polar angle and a particular azimuth angle. Additionally, individual elements may be associated with a depth value (e.g., a radial distance to particular depth viewpoint 45). If exemplary depth image 40 is a flat surface arranged orthogonally to a viewing direction of depth sensor 110, elements closer to the corners of observable space (such as elements 40f and 40L) will have a greater radial distance than elements further from the corners (such as elements 40h, 40i, and 40j). By way of non-limiting example, FIG. 4B illustrates an exemplary depth image 41 from an elevated viewpoint, similar to exemplary depth image 40 in FIG. 4A. From the perspective of a viewer of exemplary depth image 41, boundary 40a may be the bottom right corner of the image, and boundary 40b may be the bottom left corner of exemplary depth image 40.

Figure 4C:
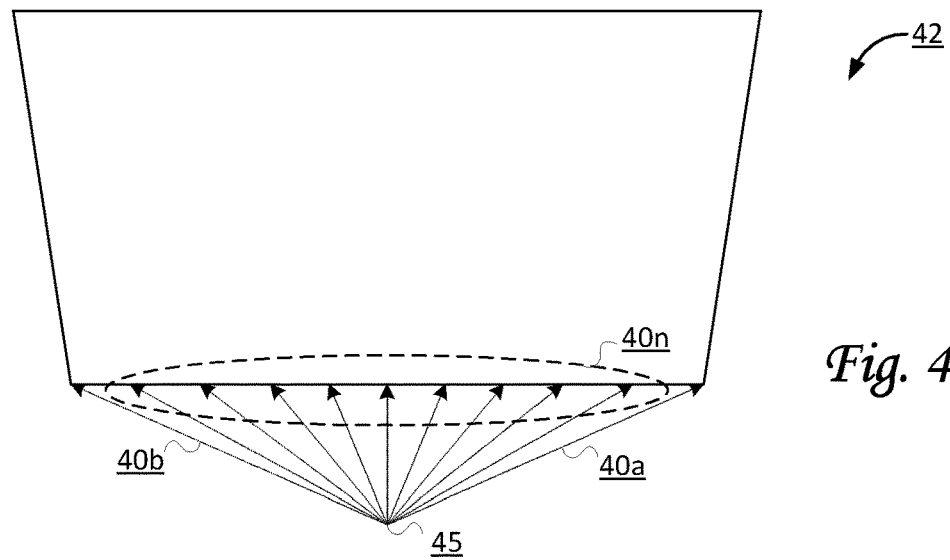

In some implementations, the elements in a depth image may be arranged in a grid. For example, as depicted in FIG. 4B, the center row of elements in exemplary depth image 40 may be set of elements 40*m*, such that individual elements in set 40*m* have different viewing angles. The number of elements depicted is exemplary and not intended to be limiting in any way. By way of non-limiting example, FIG. 4C illustrates an exemplary depth image 42 from an elevated viewpoint, similar to exemplary depth image 40 in FIG. 4A. From the perspective of a viewer of exemplary depth image 42, boundary 40*a* may be the bottom right corner of the image, and boundary 40*b* may be the bottom left corner of exemplary depth image 40. In some implementations, the elements in a depth image may be arranged in a grid. For example, as depicted in FIG. 4C, the bottom row of elements in exemplary depth image 42 may be set of elements 40*n*, such that individual elements in set 40*n* have different viewing angles. The number of elements depicted is exemplary and not intended to be limiting in any way. The exemplary depth images in FIGS. 4A-4B-4C may be combined such that the superset of depicted elements forms a grid.

Depth sensor 108 may be moving while capturing depth images. As depth sensor 110 moves, it may also rotate, e.g. in three dimensions. By way of non-limiting example, depth sensor 110 may be a consumer-grade depth sensor, such as the INTEL™ REALSENSE™ R200. In some implementations, inertial sensor 112 may be physically and rigidly coupled to depth sensor 110, image sensor 108, and/or another component of system 100. Accordingly, information from inertial sensor 112 may not only reflect motion of inertial sensor 112, but may also correspond in a known manner to motion of depth sensor 110, image sensor 108, and/or another component of system 100.

Referring to FIG. 1, inertial sensor 112 may be configured to capture and/or generate inertial signals. The inertial signals may convey values that are used to determine motion parameters. The motion parameters may characterize position, orientation, and/or other characteristics of inertial sensor 112, including characteristics pertaining to movement and/or position in a reference coordinate system. In some implementations, one or more motion parameters may include derivatives of position, orientation, and/or other characteristics of inertial sensor 112. In some implementations, one or more motion parameters may be referred to as "absolute," i.e., with respect to a reference coordinate system. In some implementations, one or more motion parameters may be referred to as "relative," i.e., with respect to other motion parameters (e.g., a first orientation and a second orientation may be used as relative to each other). The inertial signals may include a first set of inertial signals generated at a first inertial-sensor-measurement time, a second set of inertial signals generated at a second inertial-sensor-measurement time, a third set of inertial signals generated at a third inertial-sensor-measurement time, and so forth. In some implementations, the first set of inertial signals may convey a first set of values that is used to determine a first set of (absolute) motion parameters, the second set of inertial signals may convey a second set of values that is used to determine a second set of (absolute) motion parameters, the third set of inertial signals may convey a third set of values that is used to determine a third set of (absolute) motion parameters, and so forth. In some implementations, two or more absolute motion parameters (of the inertial sensor) may be used to determine the relative motion parameters between two inertial-sensor-measurement times. In some implementations, these absolute motion parameters may be used to determine the absolute motion parameters (and/or the relative motion parameters) of any other sensor. In some implementations, the first set of motion parameters may include the same parameters as the second set on motion parameters, and/or the third set of motion parameters (such as, e.g., an absolute position and/or an absolute orientation). In some implementations, the first inertial-sensor-measurement time may occur before a particular image capture time. In some implementations, the second inertial-sensor-measurement time may occur after the particular image capture time. The first set of values of the first set of motion parameters may include a first position and a first orientation in the reference coordinate system. The second set of values of the second set of motion parameters may include a second position and a second orientation in the reference coordinate system. The third set of values of the third set of motion parameters may include a third position and a third orientation in the reference coordinate system.

In some implementations, inertial sensor 112 may be or include an inertial measurement unit (IMU). In some implementations, inertial sensor 112 may include a gyroscope. In some implementations, the parameters may include angular velocity and/or a parameter based on or related to angular velocity. Alternatively, and/or simultaneously, in some implementations, inertial sensor 112 may include an accelerometer. In some implementations, the parameters may include acceleration and/or a parameter based on or related to acceleration. As used herein, acceleration may include two-dimensional acceleration, three-dimensional acceleration, angular acceleration, and/or other types of acceleration. For example, in some implementations, the parameters may include one or more of yaw rate, roll rate, and/or pitch rate. In some implementations, inertial sensor 112 may be configured to process inertial information and/or signals and provide, at a particular rate, an absolute orientation, absolute position, and/or other absolute motion parameters within a reference coordinate system. For example, the particular rate may be 30 Hz, 60 Hz, 90 Hz, 120 Hz, 150 Hz, 180 Hz, and/or another rate. In some implementations, inertial sensor 112, IMU, and/or another component of system 100 may be configured to provide derivatives of rotation and/or translation such that absolute motion parameters may be determined by integrating one or more derivatives. In some implementations, an external system may remove bias from the generated output signals by inertial sensor 112. In some implementations, such an external system may use a Kalman filter and/or other filters to filter and/or otherwise preprocess the generated output signals, and, e.g., provide absolute motion parameters.

Thermal sensor 120 may be configured to capture thermal images including thermal information. The thermal images may include a first thermal image captured from a particular viewpoint and a particular capture time. In some implementations, elements of the thermal information may be arranged in a grid.

Server(s) 102 may be configured by machine-readable instructions 106. Machine-readable instructions 106 may include one or more instruction components. The instruction components may include computer program components. The instruction components may include one or more of reprojection component 116, alignment component 118, image capture component 120, thermal projection component 122, display component 124, and/or other instruction components.

Parameter determination component 114 may be configured to determine sets of values of motion parameters.

Figure 6A:
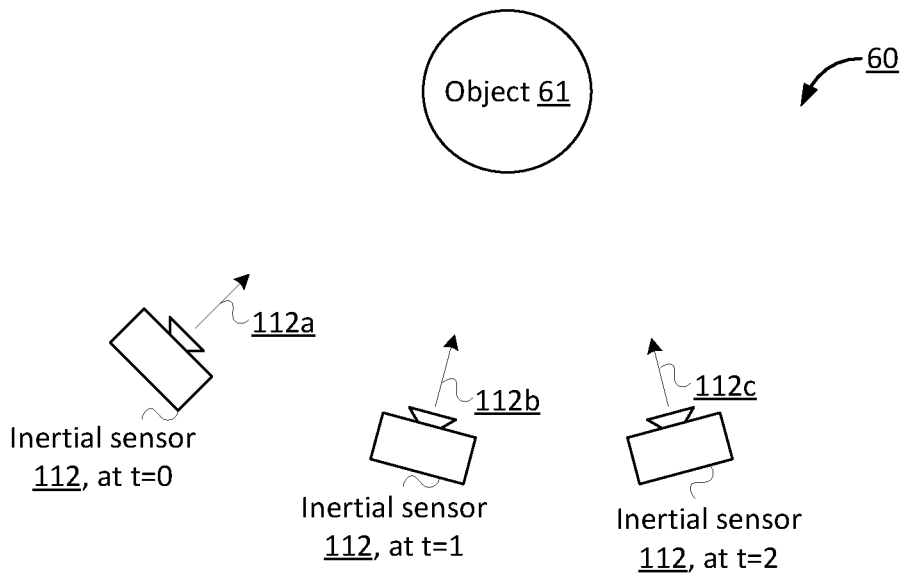
FIG. 6A-6B illustrate exemplary scenarios for the use of a system configured for generating composite sets of data from different sensors, in accordance with one or more implementations.
Figure 6B:
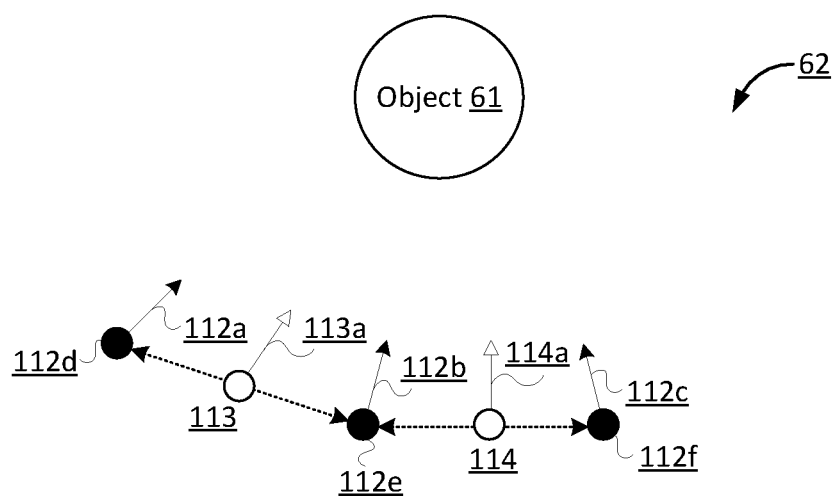

Determinations by parameter determination component 114 may be based on signals generated and/or provided by other sensors, such as inertial sensor 112. For example, a first set of values of motion parameters may be based on a first set of inertial signals, a second set of values of motion parameters may be based on a second set of inertial signals, and so forth. In some implementations, parameter determination component 114 may be configured to determine an interpolated set of values of (absolute or relative) interpolated motion parameters based on multiple sets of values of motion parameters, such as, for example, a first set of values and a second set of values. For example, the sets of values may include a first set of values for a first position and a first orientation of inertial sensor 112 (and/or another component of system 100) and a second set of values for a second position and a second orientation of inertial sensor 112 (and/or another component of system 100). In some implementations, the interpolated set of values may include an interpolated position (e.g., based on interpolating the first position and the second position) and an interpolated orientation (e.g., based on interpolating the first orientation and the second orientation) in a reference coordinate system. The interpolated set of values may correspond to a point in time between the first inertial-sensor-measurement time and the second inertial-sensor-measurement time. In some implementations, the point in time of the interpolated set of values may coincide with a particular image capture time. In some implementations, the interpolated position may coincide with a particular image viewpoint. By way of non-limiting example, FIG. 6A-6B illustrate exemplary scenarios including interpolation, as described herein. FIG. 6A illustrates a scenario 60, depicted from a top view, in which inertial sensor 112 moves in time near a stationary object 61. As depicted, the position of inertial sensor 112 changes over time, as the time progresses from a time indicated by t=0 to a subsequent time indicated by t=1, to a subsequent time indicated by t=2. During this movement, inertial sensor 112 rotates, such that an orientation 112a at time t=0 progresses to an orientation 112b at time t=1 and subsequently to an orientation 112c at time t=2. FIG. 6B illustrates a similar scenario, scenario 62, in which a position of a moving sensor changes over time, starting at a position 112d (corresponding to a time t=0 and orientation 112a), progressing to a position 112e (corresponding to a time t=1 and orientation 112b), and subsequently to a position 112f (corresponding to a time t=2 and orientation 112c). Position 112d and position 112e may be interpolated to create and/or determine interpolated position 113 (corresponding to an interpolated orientation 113a), e.g., between positions 112d and 112e. For example, such a position may correspond to any point in time between t=0 and t=1, e.g. t=0.5. Likewise, position 112e and position 112f may be interpolated to create and/or determine interpolated position 114 (corresponding to an interpolated orientation 114a), e.g., between positions 112e and 112f. Orientation 112a and orientation 112b may be interpolated to create and/or determine orientation 113a that corresponds to interpolated position 113, and orientation 112b and orientation 112c may be interpolated to create and/or determine an orientation 114a that corresponds to interpolated position 114. In some implementations, more than two positions and/or orientations may be used to interpolate at a specific point in time.

Figure 7A:
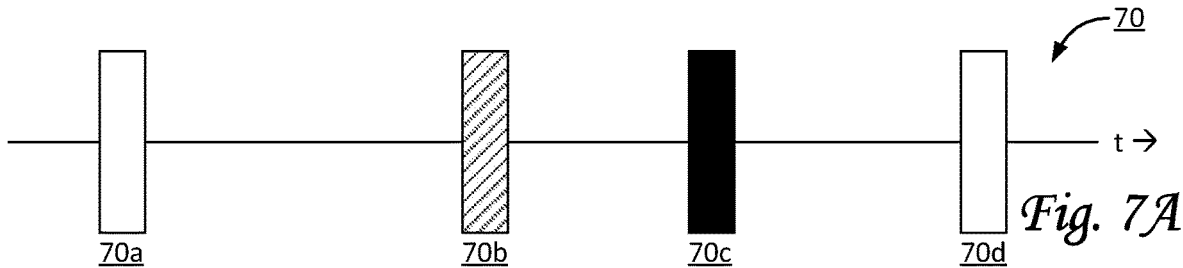
FIG. 7A-7B-7C illustrate exemplary timelines with sensor operations for the use of a system configured for generating composite sets of data from different sensors, in accordance with one or more implementations.
Figure 7B:
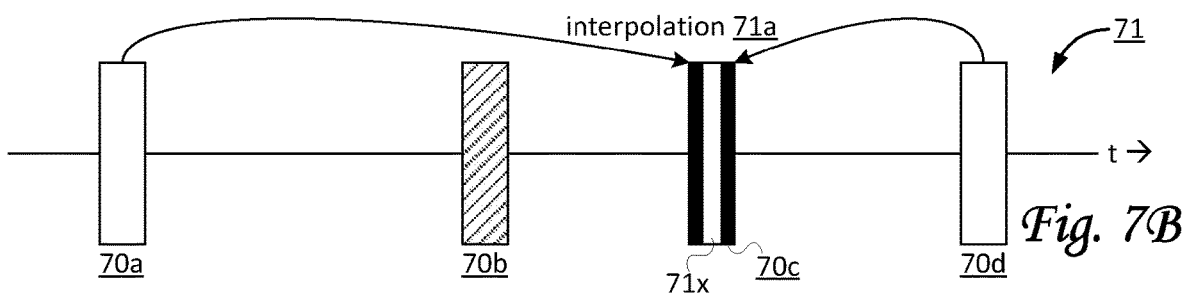

By way of non-limiting example, FIG. 7A-7B illustrate exemplary timelines with sensor operations that are interpolated, as described herein. FIG. 7A illustrates a timeline 70 depicting the occurrences of different sensor operations at different times. First, measurement 70a occurs, when inertial sensor 112 generates a first set of signals conveying values that is used to determine a first position and a first orientation in a reference coordinate system. Subsequently, measurement 70b occurs, when depth sensor 110 captures a first depth image. Subsequently, measurement 70c occurs, when image sensor 108 captures a first (color) image. Finally, measurement 70d occurs, when inertial sensor 112 generates a second set of signals conveying values that is used to determine a second position and a second orientation in the reference coordinate system. FIG. 7B illustrates a timeline 71 that is similar to timeline 70 in FIG. 7A, with the addition of interpolation 71a, which represents an interpolation of motion parameters based on measurements 70a and 70d to create an interpolated position and an interpolated orientation (a set 71x of interpolated parameters). This interpolation may be weighted to coincide with the point in time of the occurrence of measurement 70c. In some implementations, a set of motion parameters can be interpolated to create an interpolated position corresponding to a time that coincides with another measurement or capture (e.g., with the capture of an image such as a color image) provided that at least one motion parameter is determined at a moment that occurred prior to the capture time of the image and at least one motion parameter is determined at a moment that occurred subsequent to the capture time of the image. For example, in some implementations, three or four or more than four motion parameters may be used for the interpolation.

Referring to FIG. 1, in some implementations, parameter determination component 114 may be configured to determine the relative motion parameters of the depth sensor 110 from any depth timestamp to any point in time that interpolation occurs. For example, the relative motion parameters may be the rotational and positional change of the depth sensor from the first depth timestamp to a subsequent point in time of interpolation occurrence. For example, the subsequent point in time may be the point in time between the first inertial-sensor-measurement time and the second inertial-sensor-measurement time. In some implementations, determining the interpolated set of motion parameters may include determining a positional change between the position of a first depth viewpoint and a position at a subsequent point in time.

Figure 7C:
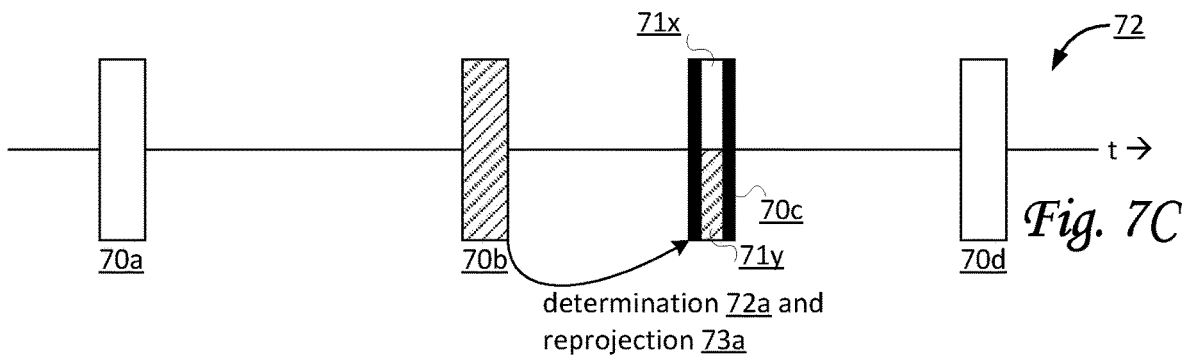

By way of non-limiting example, FIG. 7C illustrates a timeline 72 that is similar to timeline 71 in FIG. 7B, with the addition of determination 72a and reprojection 73a. Determination 72a represents the determination of the relative motion parameters (rotational and positional change) of depth sensor 110 between the timestamps 70b and 70c. Reprojection 73a represents the reprojection (of the depth image) to timestamp 70c. By virtue of this determination, the rotation and/or position of depth sensor 110 can be estimated at the point of time of the occurrence of measurement 70c.

Reprojection component 116 may be configured to generate re-projected depth images representing particular depth information included in particular depth images as if the particular depth images had been captured at a different point in time and/or from a different viewpoint. Reprojection component 116 may be configured to generate a re-projected depth image representing the depth information included in a given depth image as if the given depth image had been captured at a particular point in time between a first inertial-sensor-measurement time and a second inertial-sensor-measurement time, e.g., at the same time as a particular image was captured by image sensor 108. In some implementations, generation of re-projected depth images may be based on one or more interpolated motion parameters. In some implementations, generation of re-projected depth images may be based on one or more rotational changes and/or positional changes of depth sensor 110 and/or any other sensor. In some implementations, a re-projected depth image may use the same reference coordinate system as an image captured by image sensor 108. In some implementations, re-projection may be based on Euclidean geometry. In some implementations, reprojection by reprojection component 116 may use a first three-dimensional point cloud (based on a first depth image captured at a first point in time), perform a three-dimensional rigid transformation to create a second three-dimensional point cloud (e.g., based on an estimated relative position and orientation of depth sensor 110 between the first point in time and a second point in time, such that the second three-dimensional point cloud corresponds to the second point in time), and convert the second three-dimensional point cloud into a second depth image as if the second depth image had been captured at the second point in time (and/or from the second viewpoint). The second point in time may be when a particular color image as captured. In some implementations, the rigid transformation may be based on an estimated relative rotation and translation between the first and second point in time of another sensor, such as inertial sensor 112.

Figure 8:
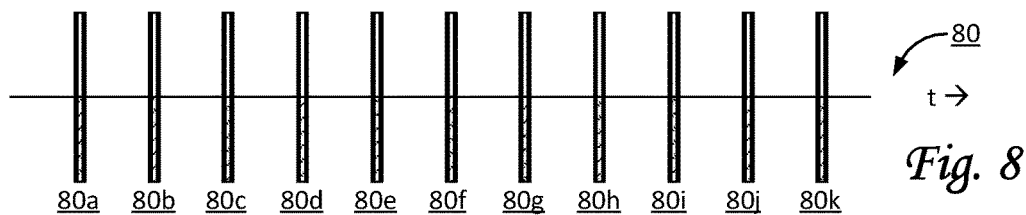
FIG. 8 illustrates an exemplary timeline with composite sets of data, in accordance with one or more implementations.

Alignment component 118 may be configured to generate composite sets of data. In some implementations, alignment component 118 may be configured to combine information from one or more images captured by image sensor 108, one or more depth images captured by depth sensor 110, one or more motion parameters (based on inertial signals generated and/or provided by inertial sensor 112), and/or one or more thermal images captured by thermal sensor 120. In some implementations, alignment component 118 may be configured to generate a composite set of data by combining information from a color image and a re-projected depth image. In some implementations, the composite set of data may include one or more values of interpolated motion parameters. For example, a composite set of data may approximate the combination of image information and depth information as if these had been captured at the same time and/or using the same viewpoint. By way of non-limiting example, FIG. 8 illustrates a timeline 80 with composite sets of data. Measurement 80a occurs when image sensor 108 captures an image. By virtue of the technologies described herein, (re-projected) depth information and one or more motion parameters may be temporally aligned with the captured image information at measurement 80a. In some implementations, the depth image may be further re-projected by reprojection component 116 such that both the time and the viewpoint of the re-projected depth image of 80a coincide with the time and the viewpoint (resp.) of the color image. In some implementations, the absolute motion parameters of the image sensor are determined by parameter determination component 114 and inserted into a composite set, such that all the different types of information (e.g., depth, color, motion parameters) correspond to the same point in time (the color image timestamp) and the same viewpoint (the color image viewpoint) in the reference coordinate system. As depicted, measurements 80b, 80c, 80d, 80e, 80f, 80g, 80h, 80i, 80j, and 80k occur at regular intervals, indicating a regular rate of capture by image sensor 108. Individually captured image information may be temporally aligned with captured depth information (in case the respective capture times naturally coincide) or re-projected depth information (in case a particular depth capture time does not naturally coincide with a particular image capture time). In some implementations, individually captured image information may be temporally aligned with one or more motion parameters, and/or other parameters.

Thermal projection component 122 may be configured to generate re-projected thermal images representing thermal information included in captured thermal image as if the captured thermal images had been captured at different points in time. For example, at a point in time between a first inertial-sensor-measurement time and a second inertial-sensor-measurement time. In some implementations, a composite set of data may further include information from a re-projected thermal image. In some implementations, depth image information may be used to re-project a thermal image.

Display component 124 may be configured to present images on a display 134 of an augmented reality device 132 to a user such that the user can view reality and the images simultaneously. The presented images may be based at least in part on information included in one or more composite sets of data.

Figure 9A:
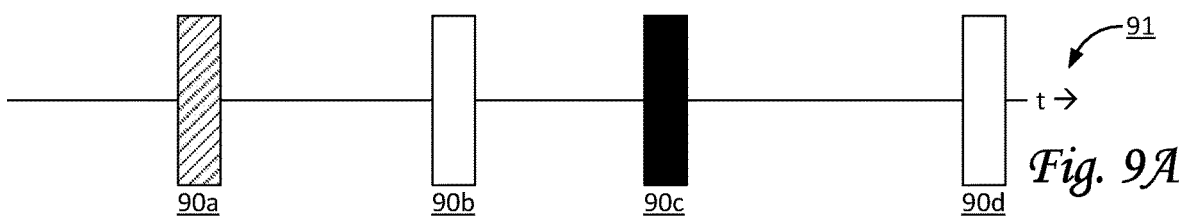
FIG. 9A-9B-9C-9D illustrate exemplary timelines with sensor operations for the use of a system configured for generating composite sets of data from different sensors, in accordance with one or more implementations.
Figure 9B:
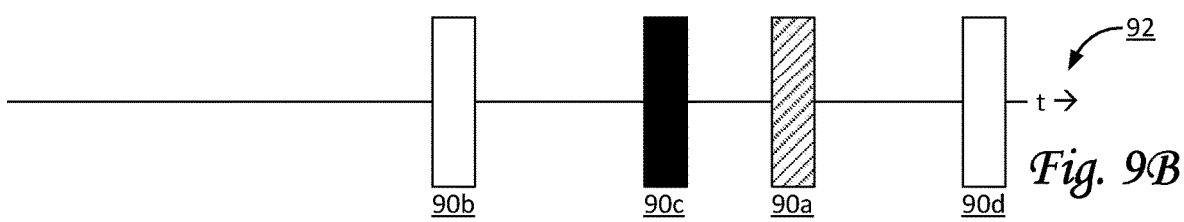
Figure 9C:
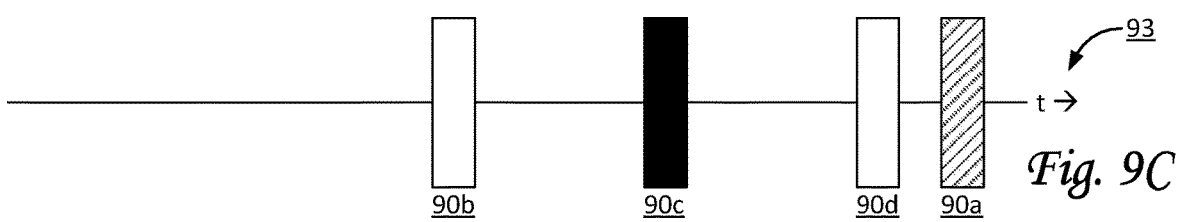

The particular and relative occurrences of different measurements in FIGS. 7A-7B-7C is exemplary and not intended to be limiting in any way. By way of non-limiting example, FIGS. 9A-9B-9C-9D illustrate exemplary timelines with sensor operations for the use of system 100. FIG. 9A illustrates a timeline 91 in which a measurement 90a occurs first, when depth sensor 110 captures a depth image, followed by measurement 90b, when inertial sensor 112 generates a first set of signals conveying values that are used to determine a first position and a first orientation in a reference coordinate system. Subsequently, measurement 90c occurs, when image sensor 108 captures an image. Finally, measurement 90d occurs, when inertial sensor 112 generates a second set of signals conveying values that are used to determine a second position and a second orientation in the reference coordinate system. Through use of the technologies described herein, the information from measurements 90b and 90d can be used (interpolated) to determine, e.g., the position and orientation of image sensor 108 during measurement 90c. This information may be used to re-project the captured depth image as if it has been captured at the same time as measurement 90c. By way of non-limiting example, FIG. 9B illustrates a timeline 92, in which measurement 90a occurs between measurements 90c and 90d. The information from measurements 90b and 90d can be used (interpolated) to determine, e.g., the position and orientation of image sensor 108 during measurement 90c. This information may be used to re-project the captured depth image as if it has been captured at the same time as measurement 90c. By way of non-limiting example, FIG. 9C illustrates a timeline 93, in which measurement 90a occurs after measurement 90d. The information from measurements 90b and 90d can be used (interpolated) to determine, e.g., the position and orientation of image sensor 108 during measurement 90c. This information may be used to re-project the captured depth image as if it has been captured at the same time as measurement 90c.

Figure 9D:
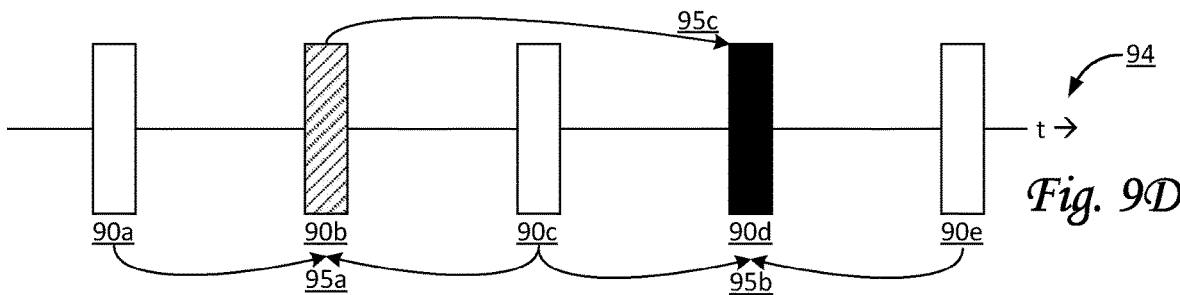

By way of non-limiting example, FIG. 9D illustrates a timeline 94 in which a measurement 90a occurs first, when inertial sensor 112 generates a first set of signals, followed by measurement 90b, when depth sensor 110 captures a depth image. Subsequently, measurement 90c occurs, inertial sensor 112 generates a second set of signals, followed by measurement 90d when image sensor 108 captures an image. Finally, measurement 90e occurs, when inertial sensor 112 generates a third set of signals. Through use of the technologies described herein, the absolute poses (positions and orientations) from measurements 90a and 90c can be used (indicated as an interpolation 95a) to determine the absolute position and orientation at the moment of measurement 90b. The absolute poses from measurements 90c and 90e can be used (indicated as an interpolation 95b) to determine the absolute position and orientation at the moment of measurement 90d. The determined absolute poses at the moments of measurements 90b and 90d may be used (indicated as a relative pose determination and depth re-projection 95c) to determine the relative pose from (the moments in time of) measurements 90b and 90d. Subsequently, this relative pose may be used to re-project the depth image (as indicated as part of relative pose determination and depth re-projection 95c).

Referring to FIG. 1, in some implementations, server(s) 102, client computing platform(s) 104, and/or external resources 126 may be operatively linked via one or more electronic communication links. For example, such electronic communication links may be established, at least in part, via one or more networks 13 such as, e.g., the Internet and/or other networks. It will be appreciated that this is not intended to be limiting, and that the scope of this disclosure includes implementations in which server(s) 102, client computing platform(s) 104, and/or external resources 126 may be operatively linked via some other communication media.

A given client computing platform 104 may include one or more processors configured to execute computer program components. The computer program components may be configured to enable an expert or user associated with the given client computing platform 104 to interface with system 100 and/or external resources 126, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 126 may include sources of information outside of system 100, external entities participating with system 100, and/or other resources. In some implementations, some or all of the functionality attributed herein to external resources 126 may be provided by resources included in system 100.

Server(s) 102 may include electronic storage 128, one or more processors 130, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 114, 116, 118, 122, and/or 124, and/or other components. Processor(s) 130 may be configured to execute components 114, 116, 118, 122, and/or 124, and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 114, 116, 118, 122, and/or 124 are illustrated in FIG. 1 as being implemented within a single processing unit, in implementations in which processor(s) 130 includes multiple processing units, one or more of components 114, 116, 118, 122, and/or 124 may be implemented remotely from the other components. The description of the functionality provided by the different components 114, 116, 118, 122, and/or 124 described below is for illustrative purposes, and is not intended to be limiting, as any of components 114, 116, 118, 122, and/or 124 may provide more or less functionality than is described. For example, one or more of components 114, 116, 118, 122, and/or 124 may be eliminated, and some or all of its functionality may be provided by other ones of components 114, 116, 118, 122, and/or 124. As another example, processor(s) 130 may be configured to execute one or more additional components that may perform some or all of the functionality attributed below to one of components 114, 116, 118, 122, and/or 124.

Figure 2:
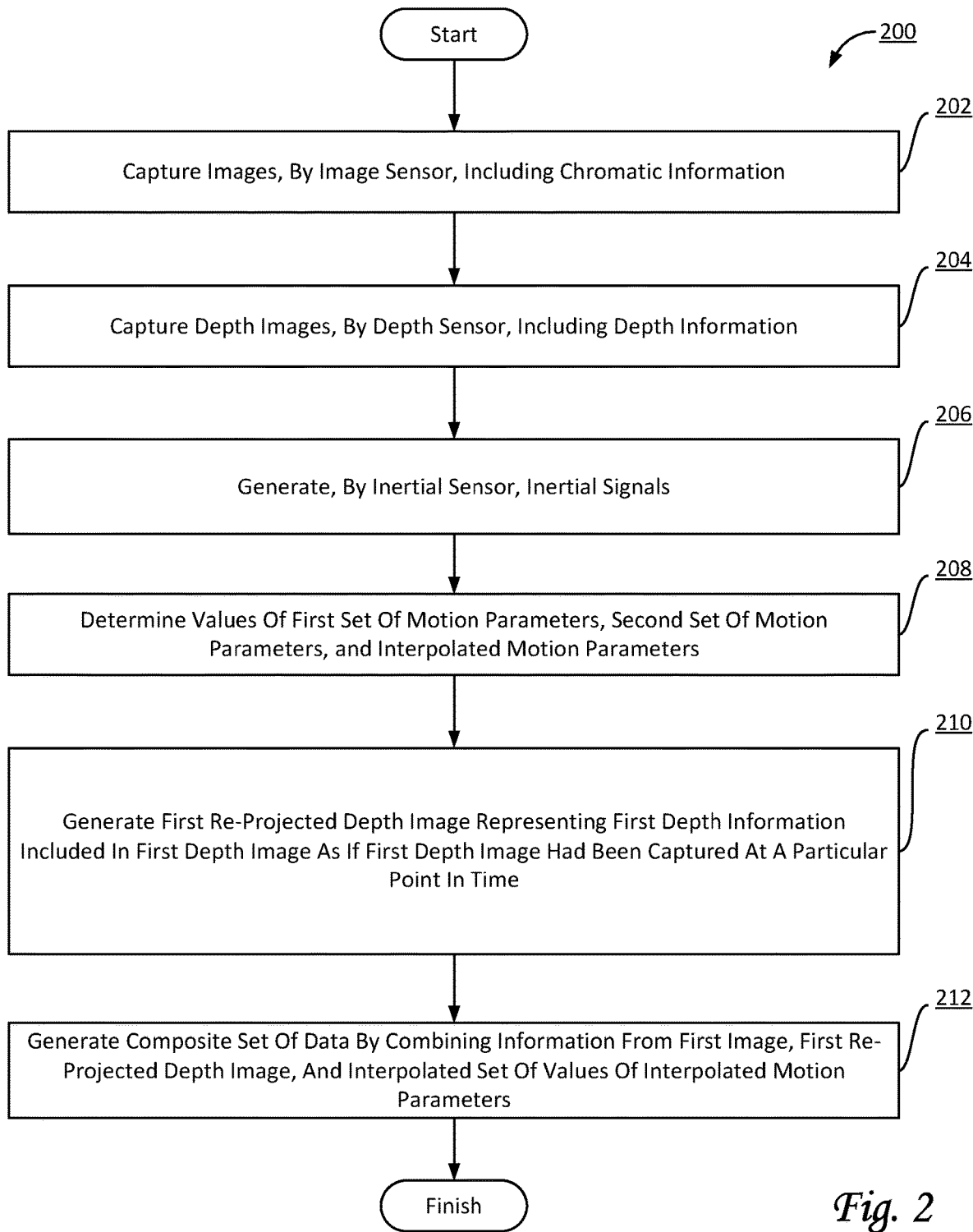
FIG. 2 illustrates a method for generating composite sets of data from different sensors, in accordance with one or more implementations.

FIG. 2 illustrates a method 200 for generating composite sets of data from different sensors, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include capturing, by an image sensor, images from viewpoints. The images may include chromatic information. The chromatic information of individual images may indicate one or more colors viewable by the image sensor from individual viewpoints of the image sensor. The images may include a first image captured at a first image capture time from a first image viewpoint. Operation 202 may be performed by an image sensor that is the same as or similar to image sensor 108, in accordance with one or more implementations.

An operation 204 may include capturing, by a depth sensor, depth images from viewpoints of the depth sensor. The depth images may include depth information. The depth information of individual depth images may be captured from individual viewpoints of the depth sensor. The depth information of the individual depth images may indicate distances from the individual viewpoints to surfaces viewable by the depth sensor from the individual viewpoints. The depth images may include a first depth image including first depth information. The first depth information may be captured from a first depth viewpoint at a first depth-capture time. Operation 204 may be performed by a depth sensor that is the same as or similar to depth sensor 110, in accordance with one or more implementations.

An operation 206 may include generating, by an inertial sensor, inertial signals that convey values that are used to determine motion parameters characterizing position and orientation of the inertial sensor in a reference coordinate system. The inertial signals may include a first set of inertial signals generated at a first inertial-sensor-measurement time that convey a first set of values that is used to determine a first set of motion parameters. The inertial signals may further include a second set of inertial signals generated at a second inertial-sensor-measurement time that convey a second set of values that is used to determine a second set of motion parameters. Operation 206 may be performed by an inertial sensor that is the same as or similar to inertial sensor 112, in accordance with one or more implementations.

An operation 208 may include determining the first set of values of the first set of one or more motion parameters based on the first set of inertial signals, the second set of values of the second set of one or more motion parameters based on the second set of inertial signals, and an interpolated set of values of one or more interpolated motion parameters based on the first set of values and the second set of values. The interpolated set of values may correspond to a point in time between the first inertial-sensor-measurement time and the second inertial-sensor-measurement time. Operation 208 may be performed by one or more hardware processors configured by machine-readable instructions including a component that is the same as or similar to parameter determination component 114, in accordance with one or more implementations.

An operation 210 may include generating a first re-projected depth image representing the first depth information included in the first depth image as if the first depth image had been captured at the point in time between the first inertial-sensor-measurement time and the second inertial-sensor-measurement time, wherein generation is based on the interpolated set of values. Operation 210 may be performed by one or more hardware processors configured by machine-readable instructions including a component that is the same as or similar to reprojection component 116, in accordance with one or more implementations.

An operation 212 may include generating a composite set of data by combining information from the first image, the first re-projected depth image, and the interpolated set of values of the one or more interpolated motion parameters. Operation 212 may be performed by one or more hardware processors configured by machine-readable instructions including a component that is the same as or similar to alignment component 118, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A non-transitory computer-readable storage medium, the computer-readable storage medium including instructions that when executed by a computer, cause the computer to:

capture, by an image sensor, a first image captured at a first image capture time from a first image viewpoint;

capture, by a depth sensor, a first depth image including first depth information, wherein the first depth information is captured from a first depth viewpoint at a first depth-capture time, wherein the first depth information indicates a first set of distances from the first depth viewpoint to surfaces detected by the depth sensor:

generate, by an inertial sensor, a first set of inertial signals and a second set of inertial signals, wherein the first set of inertial signals is generated at a first inertial-sensor-measurement time and conveys a first set of values that is used to determine a first set of motion parameters, wherein the second set of inertial signals is generated at a second inertial-sensor-measurement time and conveys a second set of values that is used to determine a second set of motion parameters;

determine an interpolated set of values of one or more interpolated motion parameters based on the first set of values and the second set of values, wherein the interpolated set of values corresponds to a point in time between the first inertial-sensor-measurement time and the second inertial-sensor-measurement time;

generate, based on the interpolated set of values, a first re-projected depth image representing the first depth information included in the first depth image as if the first depth image had been captured at the point in time; and generate a composite set of data by combining information from the first image, the first re-projected depth image, and the interpolated set of values.

2. A method for generating composite sets of data based on sensor data from different sensors, the method comprising:

capturing, by an image sensor, a first image captured at a first image capture time from a first image viewpoint;

capturing, by a depth sensor, a first depth image including first depth information, wherein the first depth information is captured from a first depth viewpoint at a first depth-capture time, wherein the first depth information indicates a first set of distances from the first depth viewpoint to surfaces detected by the depth sensor;

generating, by an inertial sensor, a first set of inertial signals and a second set of inertial signals, wherein the first set of inertial signals is generated at a first inertial-sensor-measurement time and conveys a first set of values that is used to determine a first set of motion parameters, wherein the second set of inertial signals is generated at a second inertial-sensor-measurement time and conveys a second set of values that is used to determine a second set of motion parameters;

determining an interpolated set of values of one or more interpolated motion parameters based on the first set of values and the second set of values, wherein the interpolated set of values corresponds to a point in time between the first inertial-sensor-measurement time and the second inertial-sensor-measurement time;

generating, based on the interpolated set of values, a first re-projected depth image representing the first depth information included in the first depth image as if the first depth image had been captured at the point in time; and generating a composite set of data by combining information from the first image, the first re-projected depth image, and the interpolated set of values.

3. The method of claim 2, wherein the first inertial-sensor-measurement time occurs before the first image capture time, and, wherein the second inertial-sensor-measurement time occurs after the first image capture time.

4. The method of claim 2, wherein the first set of values of the first set of one or more motion parameters includes a first position and a first orientation in the reference coordinate system, wherein the second set of values of the second set of one or more motion parameters includes a second position and a second orientation in the reference coordinate system, and wherein the interpolated set of values include an interpolated position and an interpolated orientation in the reference coordinate system.

5. The method of claim 4, wherein the point in time of the interpolated set of values coincides with the first image capture time.

6. The method of claim 2, wherein determining the interpolated set of values includes determining a rotational change between an orientation of the depth sensor at the first depth viewpoint and an interpolated orientation of the depth sensor at the point in time between the first inertial-sensor-measurement time and the second inertial-sensor-measurement time.

7. The method of claim 6, wherein determining the interpolated set of values includes determining a positional change between a first depth position and an interpolated position at the point in time between the first inertial-sensor-measurement time and the second inertial-sensor-measurement time.

8. The method of claim 7, wherein generating the first re-projected depth image is based on the rotational change and the positional change.

9. The method of claim 2, wherein the motion parameters include one or more of angular velocity and/or acceleration.

10. The method of claim 2, further comprising:

capturing thermal images including thermal information, wherein the thermal images include a first thermal image captured from a particular viewpoint and a particular capture time; and generating a first re-projected thermal image representing thermal information included in the first thermal image as if the first thermal image had been captured at the point in time between the first inertial-sensor-measurement time and the second inertial-sensor-measurement time, wherein the composite set of data further includes information from the first re-projected thermal image.

11. The method of claim 2, further comprising:

capturing, by the image sensor, images from viewpoints, the images including chromatic information, the chromatic information of individual images indicating one or more colors viewable by the image sensor from individual viewpoints of the image sensor, wherein the images comprise the first image;

capturing, by the depth sensor, depth images from viewpoints of the depth sensor, the depth images including depth information, wherein the depth information of individual depth images is captured from individual viewpoints of the depth sensor, wherein the depth information of the individual depth images indicates distances from the individual viewpoints of the depth sensor to surfaces viewable by the depth sensor from the individual viewpoints, wherein the depth images comprise the first depth image; and generating, by the inertial sensor, inertial signals that convey values that are used to determine motion parameters characterizing position and orientation of the inertial sensor in a reference coordinate system, wherein the inertial signals comprise the first set of inertial signals and the second set of inertial signals.

12. A computing apparatus comprising:

a processor; and a memory storing instructions that, when executed by the processor, configure the apparatus to:

capture, by an image sensor, a first image captured at a first image capture time from a first image viewpoint;

capture, by a depth sensor, a first depth image including first depth information, wherein the first depth information is captured from a first depth viewpoint at a first depth-capture time, wherein the first depth information indicates a first set of distances from the first depth viewpoint to surfaces detected by the depth sensor;

generate, by an inertial sensor, a first set of inertial signals and a second set of inertial signals, wherein the first set of inertial signals is generated at a first inertial-sensor-measurement time and conveys a first set of values that is used to determine a first set of motion parameters, wherein the second set of inertial signals is generated at a second inertial-sensor-measurement time and conveys a second set of values that is used to determine a second set of motion parameters;

determine an interpolated set of values of one or more interpolated motion parameters based on the first set of values and the second set of values, wherein the interpolated set of values corresponds to a point in time between the first inertial-sensor-measurement time and the second inertial-sensor-measurement time;

generate, based on the interpolated set of values, a first re-projected depth image representing the first depth information included in the first depth image as if the first depth image had been captured at the point in time; and generate a composite set of data by combining information from the first image, the first re-projected depth image, and the interpolated set of values.

13. The computing apparatus of claim 12, wherein the first inertial- sensor-measurement time occurs before the first image capture time, and wherein the second inertial-sensor-measurement time occurs after the first image capture time.

14. The computing apparatus of claim 12, wherein the first set of values of the first set of one or more motion parameters includes a first position and a first orientation in the reference coordinate system, wherein the second set of values of the second set of one or more motion parameters includes a second position and a second orientation in the reference coordinate system, and wherein the interpolated set of values include an interpolated position and an interpolated orientation in the reference coordinate system.

15. The computing apparatus of claim 14, wherein the point in time of the interpolated set of values coincides with the first image capture time.

16. The computing apparatus of claim 12, wherein determine the interpolated set of values includes determining a rotational change between an orientation of the depth sensor at the first depth viewpoint and an interpolated orientation of the depth sensor at the point in time between the first inertial-sensor-measurement time and the second inertial-sensor-measurement time.

17. The computing apparatus of claim 16, wherein determine the interpolated set of values includes determining a positional change between a first depth position and an interpolated position at the point in time between the first inertial-sensor-measurement time and the second inertial-sensor-measurement time.

18. The computing apparatus of claim 17, wherein generating the first re-projected depth image is based on the rotational change and the positional change.

19. The computing apparatus of claim 12, wherein the motion parameters include one or more of angular velocity and/or acceleration.

20. The computing apparatus of claim 12, wherein the instructions further configure the apparatus to:

capture thermal images including thermal information, wherein the thermal images include a first thermal image captured from a particular viewpoint and a particular capture time; and generate a first re-projected thermal image representing thermal information included in the first thermal image as if the first thermal image had been captured at the point in time between the first inertial-sensor-measurement time and the second inertial-sensor-measurement time, wherein the composite set of data further includes information from the first re-projected thermal image.

\* \* \* \* \*